United States Patent
Hussain et al.

(10) Patent No.: US 12,228,720 B1
(45) Date of Patent: Feb. 18, 2025

(54) SYSTEM FOR MICROSCOPY SLIDE LOCKING USING A SWIVEL MECHANISM AND METHOD OF USE THEREOF

(71) Applicant: Pramana, Inc., Cambridge, MA (US)

(72) Inventors: Mohd. Akber Hussain, Bengaluru (IN); Prasanth Perugupalli, Cary, NC (US); Vinothkumar Anbalagan, Tamilnadu (IN); Ajay Chadha, Bangalore (IN); S Jayakrishna, Bangalore (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/796,717

(22) Filed: Aug. 7, 2024

(51) Int. Cl.
*G02B 21/34* (2006.01)
*G02B 21/26* (2006.01)

(52) U.S. Cl.
CPC .............. *G02B 21/26* (2013.01); *G02B 21/34* (2013.01)

(58) Field of Classification Search
CPC ...... G02B 21/082; G02B 21/26; G02B 21/34; G02B 21/36; G02B 21/362; G01N 1/02; G01N 2035/00039; G01N 2035/00089; G01N 2035/00138; G01N 35/00029; B65G 49/062; B65G 49/068
See application file for complete search history.

(56) References Cited

U.S. PATENT DOCUMENTS

| 7,776,195 | B2 * | 8/2010 | Kureshy | .......... | G01N 35/00029 |
| | | | | | 435/6.19 |
| 10,942,347 | B2 * | 3/2021 | Newberg | ............. | G02B 21/362 |

FOREIGN PATENT DOCUMENTS

| CN | 211698410 | U | | 10/2020 |
| CN | 213814130 | A | * | 3/2021 |
| CN | 213814130 | U | | 7/2021 |
| DE | 1589647 | A1 | | 5/1970 |

* cited by examiner

*Primary Examiner* — Mustak Choudhury
(74) *Attorney, Agent, or Firm* — Caldwell Intellectual Property Law

(57) ABSTRACT

A system for microscopy slide locking include a stage slot configured to fit a microscopy slide, the stage slot including a first corner and a second corner diagonally across the first corner, a static securing element disposed at the first corner and configured to contact a microscopy slide at a first pair of its orthogonal, intersecting edges, and a dynamic securing element disposed at the second corner and configured to contact the microscopy slide at a second pair of its orthogonal, intersecting edges diagonally opposite the first pair of its orthogonal, intersecting edges, wherein the dynamic securing element includes a translating portion configured to slide in a translational direction between a proximal position and a distal position and a rotating portion rotationally connected to the translating portion and configured to rotate around an axis of rotation normal to a face of the microscopy slide and the translational direction.

20 Claims, 7 Drawing Sheets

SYSTEM FOR MICROSCOPY SLIDE LOCKING USING A SWIVEL MECHANISM AND METHOD OF USE THEREOF

FIELD OF THE INVENTION

The present invention generally relates to the field of sample-securing devices for high-precision instruments. In particular, the present invention is directed to a system for microscopy slide locking using a swivel mechanism.

BACKGROUND

High-resolution imaging of microscopy slides requires magnification and acquisition of multiple views in a grid to ensure a wide coverage of contents of interest. To create a high-quality image that covers an extended area of a microscopy slide, it is crucial that the microscopy slide remains stationary or substantially stationary relative to the microscope stage. Accordingly, the microscopy slide needs to be secured by a locking mechanism, which may be either motorized or spring loaded. Traditional locking mechanisms often lack adaptability and only accommodate microscopy slides of one or a few limited sizes. Such limitation may cause a microscopy slide of a nonstandard size to shift in position during measurement or dislocate from a locking mechanism, causing misalignment and sample damage. In addition, traditional locking mechanisms typically apply pressure on one or a few localized areas of a microscopy slide using a limited number of points of contacts, which may lead to chipping, breaking, or damaging the microscopy slide. Furthermore, some traditional locking mechanisms contain designs that cause one or more elements of the locking mechanisms to be in contact with protruding labels on a microscopy slide, causing sample contamination and damage.

SUMMARY OF THE DISCLOSURE

In an aspect, a system for microscopy slide locking using a swivel mechanism is described. System includes a stage slot configured to fit a microscopy slide, the stage slot including a first corner and a second corner diagonally across the first corner. System includes a static securing element disposed at first corner, wherein the static securing element is configured to contact a microscopy slide at a first pair of orthogonal, intersecting edges of the microscopy slide. System includes a dynamic securing element disposed at second corner and configured to contact microscopy slide at a second pair of orthogonal, intersecting edges of the microscopy slide diagonally opposite first pair of orthogonal, intersecting edges of the microscopy slide. Dynamic securing element includes a translating portion configured to slide in a translational direction between a proximal position and a distal position with respect to static securing element and a rotating portion rotationally connected to the translating portion and configured to rotate around an axis of rotation that is normal to a face of the microscopy slide and the translational direction, thereby reversibly securing microscopy slide in a locked position by translating the translating portion from the distal position to the proximal position.

In another aspect, a method for microscopy slide locking using a swivel mechanism is described. Method includes placing microscopy slide on stage slot having static securing element located at a first corner. Method further includes aligning, using dynamic securing element disposed at second corner diagonally across first corner, first pair of orthogonal, intersecting edges of microscopy slide against static securing element by translating portion of the dynamic securing element in translational direction from distal position to proximal position with respect to static securing element disposed diagonally across the dynamic securing element, and rotating rotating portion of the dynamic securing element around axis of rotation that is normal to face of the microscopy slide and the translational direction to contact at second pair of orthogonal, intersecting edges of the microscopy slide diagonally opposite the first pair of orthogonal, intersecting edges of the microscopy slide. Method further includes holding microscopy slide in place using both static securing element and dynamic securing element.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to sample-securing devices for high-precision instruments such as a system for microscopy slide locking using a swivel mechanism. System includes a stage slot configured to fit a microscopy slide, the stage slot including a first corner and a second corner diagonally across the first corner. System includes a static securing element disposed at first corner, wherein the static securing element is configured to contact a microscopy slide at a first pair of orthogonal, intersecting edges of the microscopy slide. System includes a dynamic securing element disposed at second corner and configured to contact microscopy slide at a second pair of orthogonal, intersecting edges of the microscopy slide diagonally opposite first pair of orthogonal, intersecting edges of the microscopy slide. Dynamic securing element includes a translating portion configured to slide in a translational direction between a proximal position and a distal position with respect to static securing element and a rotating portion rotationally connected to the translating portion and configured to rotate around an axis of rotation that is normal to a face of the microscopy slide and the translational direction, thereby reversibly securing microscopy slide in a locked position by translating the translating portion from the distal position to the proximal position.

Aspects of the present disclosure can be used to provide a more versatile and robust platform for microscopy measurements that accommodates samples of various sizes without causing damage. Aspects of the present disclosure can be used to collect microscopy images of superior quality. For purposes of description herein, relating terms, including "top", "bottom", "left", "right", "front", "back", "vertical", "horizontal", and derivatives thereof are defined from the perspective of a hypothetical person facing or operating a microscope.

The system described in this disclosure and components therein may be constructed using any suitable material or combination of materials having both sufficient rigidity and sufficient flexibility (i.e., elasticity). Suitable material or materials may not only support the weight of and/or tolerate the tension within system while holding a microscopy slide in place, but also withstand temporary deformation from their resting positions without cracking. Static securing element may be made with relatively soft, elastic materials, such as rubber, that can reduce the impact on a microscopy slide it is in contact with. Dynamic securing element may be made, without limitation, of plant materials such as wood or bamboo, metals or metal alloys including but not limited to iron, manganese, nickel, copper, molybdenum, vanadium, silicon, titanium and/or aluminum, comparably robust synthetic and/or polymeric materials such as polyethylene (PE), polyethylene terephthalate (PETE), polypropylene (PP), polyvinyl chloride (PVC), polyvinylidene fluoride (PVDF), polytetrafluoroethylene (PTFE), and resins, composite materials such as fiberglass, any combination thereof, and/or any alternative material or materials known by a person of ordinary skill in the art having the benefit of the entirety of this disclosure to be suitable for system and elements related thereto. In some cases, part of system, such as stage slot, may be made of one or more transparent materials such as quartz, glass, treated glass including laminated safety glass, or plexiglass including, but not limited to, Lexan polycarbonate, acrylic plastics including stretched acrylic, reinforced glass, and/or any material known by a person of ordinary skill in the art having the benefit of the entirety of this disclosure to be suitable for transparent materials. Alternatively and/or additionally, one or more elements within apparatus may be treated to create any type of appearance or finish using any type of materials and/or method deemed suitable by a person of ordinary skill in the art upon reviewing the entirety of this disclosure; exemplary embodiments of finishes for plant-based materials such as wood may include pigmented wood primers, clear wood sealers, wood stains, clear lacquers, pigmented lacquer paints, varnishes, urethanes/polyurethanes, or the like; exemplary embodiments of finishes for metal-based materials may include paints, metallic/metal oxide coatings, enamels, epoxy coatings, polyurethane coatings, among others. Elements of system mentioned herein will be defined and/or described in detail below.

The invention described in this disclosure may be used for a wide range of microscopy-related applications. Various types of microscopy may be used for different scientific and medical applications, offering unique advantages tailored to specific research needs and sample characteristics. Optical microscopy may provide optical images of cellular structures. Scanning electron microscopy (SEM) may provide detailed surface images of samples using electron beams, resolving fine features that optical microscopy may not capture. Transmission electron microscopy (TEM) may offer high-resolution images of thin sample sections, revealing internal structures. Fluorescence microscopy may use fluorescent dyes to label and visualize specific components within cells. Confocal microscopy may enhance optical resolution and contrast by using point illumination and spatial pinholes to eliminate out-of-focus light. Atomic force microscopy (AFM) may provide topographical data by scanning a sample surface with a fine probe. Phase-contrast microscopy may allow visualization of transparent specimens by enhancing contrast based on refractive index differences. Dark-field microscopy may improve image contrast in unstained samples using scattered light. Polarized light microscopy may be used to study materials with birefringence properties. A person of ordinary skill in the art, upon reviewing the entirety of this disclosure, will be able to recognize additional types of microscopy not disclosed in this disclosure in which the current invention may be applicable.

Figure 1A:
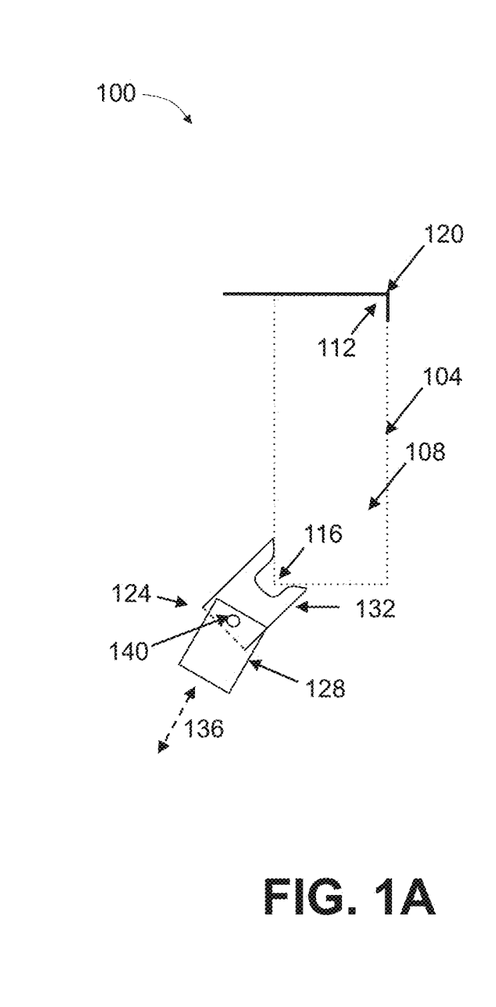
FIG. 1A is a front view of a schematic illustration of an exemplary embodiment of a system for microscopy slide locking using a swivel mechanism.
Figure 1B:
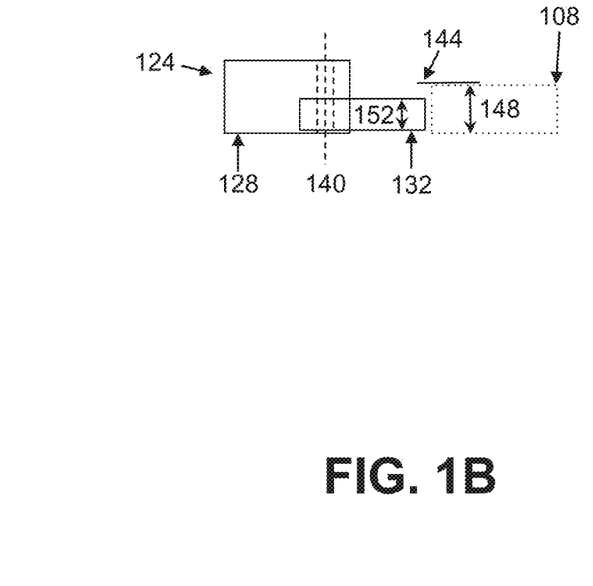
FIG. 1B is a side view of a schematic illustration of the exemplary embodiment of the system.

Referring now to FIGS. 1A-B, a system 100 for microscopy slide locking using a swivel mechanism is illustrated. FIG. 1A is a front view of a schematic illustration of an exemplary embodiment of system 100, whereas FIG. 1B is a side view of the schematic illustration. For the purposes of this disclosure, a "swivel mechanism" is a type of connecting mechanism in mechanical engineering that enables one component to rotate relative to another while maintaining a secure connection between the two. Swivel mechanism typically consists of a pivot point, bearing, or similar rotational interface that allows for smooth, controlled movement around an axis. Swivel mechanism is designed to facilitate rotational motion without compromising the stability or integrity of the connected components. Applications of swivel mechanisms include joints in machinery, connectors in fluid systems, and mounts in various mechanical assemblies where controlled rotational movement is required to enhance functionality, flexibility, and efficiency.

With continued reference to FIGS. 1A-B, system 100 includes a stage slot 104 configured to fit a microscopy slide 108. Stage slot 104 includes a first corner 112 and a second corner 116 diagonally across the first corner 112. For the purposes of this disclosure, a "stage slot" is a planar or substantially planar area within system 100 that accommodates a microscopy slide. For the purposes of this disclosure, a "substantially planar area" is an area that can be locally treated as flat despite having an extended curvature. Stage slot 104 may implement any suitable type of construction recognized by a person of ordinary skill in the art upon reviewing the entirety of this disclosure. As a nonlimiting example, stage slot 104 may include a single, continuous construction configured to support a microscopy slide. As another nonlimiting example, stage slot 104 may include one or more hollow structures, such as one or more channels.

Such channels may allow for light from a light source, which may be placed behind stage slot 104, to pass through the stage slot 104 and microscopy slide 108, thereby yielding an optical image. For the purposes of this disclosure, a "microscopy slide" is a thin, planar/substantially planar piece of material that supports a sample on which a microscopy measurement is to be performed. The type of microscopy slide 108 may serve specific purposes depending on the requirements of the microscopy technique and the nature of the sample being studied. As a nonlimiting example, microscopy slide 108 may include glass slides, which are the most common and versatile type. Microscopy slide 108 may include plastic slides, which are lightweight and shatterproof, making them ideal for educational settings. Microscopy slide 108 may include quartz slides, which may be used for ultraviolet microscopy due to their transparency to ultraviolet light. Microscopy slide 108 may include silicon slides or silicon wafers, which are often employed in high-precision applications, such as in semiconductor research. Microscopy slide 108 may include gold-coated slides, which are often used for electron microscopy and for enhancing contrast in certain staining techniques. Microscopy slide 108 may include frosted-end slides, which may have a roughened end for labeling and may be useful in clinical and research laboratories for easy identification and handling of samples. Microscopy slide 108 may be constructed in any shape deemed suitable by a person of ordinary skill in the art upon reviewing the entirety of this disclosure, such as without limitation square, rectangle, truncated square or rectangle, among others. Microscopy slide 108 may have matching shapes with stage slot 104 so that the microscopy slide may fit between first corner 112 and second corner of stage slot 104, consistent with details described elsewhere in this disclosure.

With continued reference to FIG. 1A, stage slot 104 may include a plurality of adjustable dimensions configured to fit microscopy slides 108 of a plurality of sizes. In some cases, stage slot 104 may have adjustable length and/or width that fit microscopy slides 108 of a plurality of sizes. In some cases, stage slot 104 may have an adjustable surface area that fits microscopy slides 108 of a plurality of sizes. As a nonlimiting example, the surface area of stage slot 104 may be adjusted by translating a dynamic securing element at second corner 116 with respect to a stationary securing element at first corner 112, thereby adjusting the diagonal distance in between, as described below in this disclosure. In a microscopy measurement, microscopy slide 108 needs to be placed, locked, and aligned to a particular corner of stage slot 104 on the microscope stage. Such adjustable dimensions therefore help ensure that, irrespective of dimensional variance or placement variance of microscopy slide 108, system 100 is able to reliably align microscopy slide 108 to first corner 112 of stage slot 104.

With continued reference to FIG. 1A, system 100 includes a static securing element 120 disposed at first corner 112, wherein the static securing element 120 is configured to contact microscopy slide 108 at a first pair of orthogonal, intersecting edges of the microscopy slide 108. For the purposes of this disclosure, a "static securing element" is an element that is configured to securely hold microscopy slide 108 in position by applying a pressure but does not change its position with respect to system 100. Static securing element may be implemented using any suitable means as recognized by a person of ordinary skill in the art upon reviewing the entirety of this disclosure. As a nonlimiting example, static securing element 120 may be implemented by creating one or more ridges or the like that protrude out of/elevates from a planar surface of stage slot 104, thereby blocking microscopy slide from sliding or dislocating out of the stage slot 104. As another nonlimiting example, static securing element 120 may include one or more sidewalls in transverse directions that prevent microscopy slide from sliding or dislocating.

With continued reference to FIG. 1A, system 100 includes a dynamic securing element 124 disposed at second corner 116 with respect to system 100. For the purposes of this disclosure, a "dynamic securing element" is an element that is configured to securely hold microscopy slide 108 in position by applying a pressure and does so by changing its position. Dynamic securing element 124 may be configured to toggle between multiple configurations, such as between a first, engaged configuration and a second, disengaged configuration. In some cases, dynamic securing element 124 may be referred to as a "pusher". Dynamic securing element 124 may be configured to contact microscopy slide 108 at a second pair of orthogonal, intersecting edges of the microscopy slide 108 diagonally opposite the first pair of orthogonal, intersecting edges of the microscopy slide. Specifically, microscopy slide 108 of a rectangular prism geometry may have four sides; static securing element 120 may be in contact with a first side and a second side that are connected to each other at a right angle, and accordingly, dynamic securing element 124 may be in contact with a third side and a fourth side that are connected to each other at a right angle. Such design enables static securing element 120 and dynamic securing element 124 to apply force or pressure to microscopy in opposing directions, thereby holding it in place within stage slot 104.

With continued reference to FIG. 1A, dynamic securing element 124 and any portion or element may be maneuvered either by hand or using mechanical means such as an actuator. For the purposes of this disclosure, an "actuator" is a device or a component of a machine that produces force, torque, or displacement, usually in a controlled manner, when an electrical, pneumatic, or hydraulic input is supplied to it in an actuating system and converted into a required form of mechanical energy. Actuator may, in some cases, require a control signal and/or a source of energy or power, as described below in this disclosure. In some cases, control signal may be relatively low energy. Exemplary control signal forms include electric potential or current, pneumatic pressure or flow, hydraulic fluid pressure or flow, mechanical force/torque or velocity, or even human power. In some cases, actuator may have source of energy or power other than control signal. This may include a main energy source, which may include for example electric power, hydraulic power, pneumatic power, mechanical power, and/or the like. In some cases, upon receiving control signal, actuator may respond by converting source power into mechanical motion. In some cases, actuator may be understood as a form of automation or automatic control.

With continued reference to FIG. 1A, in one or more embodiments, actuator may include a hydraulic actuator. Hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases, are incompressible, hydraulic actuators may be capable of exerting large forces. Additionally, as force is equal to pressure multiplied by area, hydraulic actuators may act as force transformers with changes in area (e.g., cross-sectional area of a cylinder and/or piston). An exemplary hydraulic cylinder may consist of a hollow cylindrical tube within which piston can slide. In some cases, hydraulic cylinder may be considered single acting. A single-acting piston may be used when fluid pressure is applied substantially to just one side of the piston. Consequently, single-acting piston may move in only one direction. In some cases, a spring may be used to give single-acting piston a return stroke. In some cases, hydraulic cylinder may be double acting. A double-acting piston may be used when pressure is applied substantially on each side of the piston; any difference in resultant force between the two sides of piston may cause the piston to move.

With continued reference to FIG. 1A, in one or more embodiments, actuator may include a pneumatic actuator. In some cases, pneumatic actuators may enable considerable forces to be produced from relatively small changes in gas pressure. In some cases, pneumatic actuators may respond more quickly than other types of actuators, for example hydraulic actuators. Pneumatic actuators may use compressible fluid. In some cases, pneumatic actuators may operate on compressed air. Operation of hydraulic and/or pneumatic actuators may include control of one or more valves, circuits, fluid pumps, and/or fluid manifolds.

With continued reference to FIG. 1A, in some cases, actuator may include an electric actuator. Electric actuator may include any electromechanical actuators, linear motors, and the like. Electromechanical actuators may convert a rotational force of an electric rotary motor into a linear movement to generate a linear motion through a mechanism. Exemplary mechanisms include rotational-to-translational motion transformers, such as without limitation a belt, a screw, a crank, a cam, a linkage, a scotch yoke, and the like. In some cases, control of electromechanical actuator may include control of electric motor; for instance, control signal may control one or more electric motor parameters to control the electromechanical actuator. Nonlimiting examples of electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, linear motor may cause less friction loss than other devices. Linear motors may be further specified into at least three different categories, including flat linear motor, U-channel linear motors and tubular linear motors. Linear motors may be directly controlled by control signal for controlling one or more linear motor parameters. Nonlimiting examples of linear motor parameters include position, force, velocity, potential, and current. In some cases, electric actuator may include a solenoid actuator. For the purposes of this disclosure, a "solenoid" is a device capable of converting electrical energy into mechanical work; it comprises a coil of wire, a housing, and a movable plunger; when an electrical current is introduced, a magnetic field forms around the coil which moves the plunger.

With continued reference to FIG. 1A, in one or more embodiments, actuator may include a mechanical actuator. In some cases, mechanical actuator may function to execute movement by converting one kind of motion, such as rotary motion, into another kind, such as linear motion. An exemplary mechanical actuator includes without limitation a rack and pinion. In some cases, a mechanical power source, such as a power take-off, may serve as a power source for mechanical actuator. Mechanical actuators may employ any number of mechanisms, including for example without limitation gears, rails, pulleys, cables, linkages, and the like.

With continued reference to FIG. 1A, dynamic securing element 124 includes a translating portion 128 and a rotating portion 132. For the purposes of this disclosure, a "translating portion" is a portion of dynamic securing element 124 that is capable of translational motions. In some cases, translating portion 128 may be referred to as a "non-rotating base". Translating portion 128 is configured to slide in a translational direction 136 between a proximal position and a distal position with respect to static securing element 120. In some cases, translating portion 128 may be pushed forward against microscopy slide 108 or retracted away from the microscopy slide 108, thereby configuring the microscopy slide 108 in locked/engaged or unlocked/disengaged configurations, respectively. Additional details will be described below. For the purposes of this disclosure, a "rotating portion" is a portion of dynamic securing element 124 that is capable of rotational motions around an axis. In some cases, rotating portion 132 may be referred to as a "swivel component". Rotating portion 132 is rotationally connected to the translating portion 128. Such connection may be implemented using any means deemed suitable by a person of ordinary skill in the art upon reviewing the entirety of this disclosure, such as without limitation screws, nuts and bolts, bearings, hinges, slip rings, swivel joints, universal joints, and bushings, among others. Rotating portion 132 is configured to rotate around an axis of rotation 140 that is normal to a face of microscopy slide 108 and translational direction 136, thereby reversibly securing microscopy slide 108 in a locked position. In some cases, translational motion of translating portion 128 and rotational motion of rotating portion 132 may be coupled. As a nonlimiting example, rotating portion 132 may be reversibly engaged to microscopy slide 108 using translating portion 128, e.g., by translating the translating portion 128 from its distal position to its proximal position. As another nonlimiting example, rotating portion 132 may be moving alongside translating portion 128 as the rotating portion 132 undergoes rotation.

With continued reference to FIG. 1A, in one or more embodiments, rotating portion 132 may include a plurality of prongs. For the purposes of this disclosure, a "prong" is an elongated structural element of rotating portion configurated to contact and apply pressure to microscopy slide 108, thereby securing it in place. As a nonlimiting example, rotating portion 132 may include two prongs. Each prong of plurality of prongs may include at least a point of contact with an edge of microscopy slide 108, consistent with details described above. In some cases, system 100 may be configured to distribute pressure using a plurality of points of contacts, thereby reducing an impact applied against microscopy slide 108. Such plurality of points of contact may be disposed at a plurality of distances from axis of rotation 140. Additional details will be provided below in this disclosure.

With continued reference to FIG. 1A, in one or more embodiments, rotating portion 132 may include a bevel or a chamfer. For the purposes of this disclosure, a "bevel" or "chamfer" is a specific geometric feature applied to the edges or corners of a workpiece, characterized by an angled surface that is typically created to remove sharp edges, facilitate assembly, or enhance the aesthetic appearance of the object. Bevel may refer to an inclined surface that forms an angle with the principal surfaces of the workpiece, generally at an angle other than 90 degrees. Similarly, chamfer may refer to an edge treatment where a straight surface is cut at an angle to eliminate the sharp edge, which is often implemented to assist in the alignment and fitting of parts, improve safety by reducing the risk of injury from sharp edges, and promote a more streamlined or visually appealing design. These features are integral in various manufacturing and engineering applications, such as woodwork, to achieve functional and ergonomic benefits. Rotating portion 132 may incorporate a bevel or a chamfer at any of its locations deemed suitable by a person of ordinary skill in the art. As a nonlimiting example, rotating portion may incorporate a bevel or a chamfer at one or more of prongs of rotating portion 132, thereby minimizing friction and/or avoiding potential damage to microscopy slide 108 and samples it supports.

Referring now to FIG. 1B, elements in system 100 may be strategically designed to avoid potential damage to samples, such as protruding labels 144, that are supported by microscopy slide 108. Specifically, microscopy slide 108 may have a first thickness 148, whereas rotating portion 132 may have a second thickness 152 smaller than the first thickness 148. Such design ensures that any motion of dynamic securing element 124, translating portion 128, and/or rotating portion 132 will avoid scraping the top surface of microscopy slide 108.

Figures 2A, 2B:
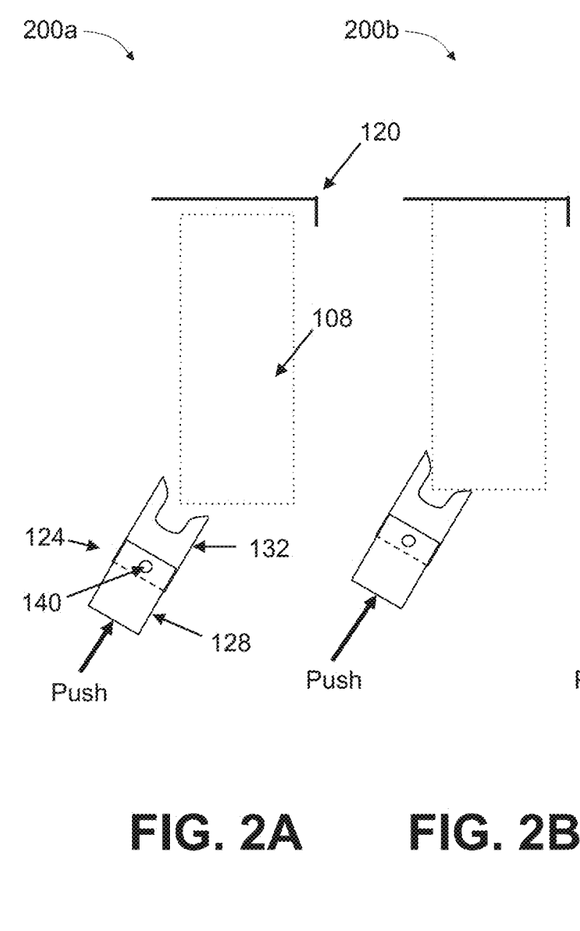
FIGS. 2A-C are schematic illustrations of exemplary embodiments of a plurality of stages pertaining to a microscopy slide locking operation.
Figure 2C:
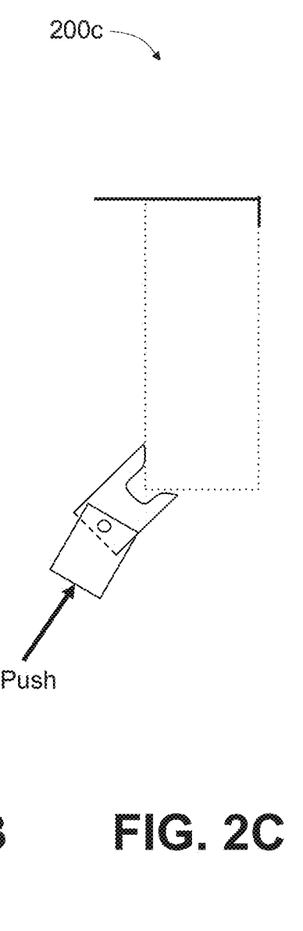

Referring now to FIGS. 2A-C, an exemplary embodiment of a plurality of stages 200*a-c* pertaining to a microscopy slide locking operation is illustrated. FIG. 2A illustrates dynamic securing element 124 (i.e., pusher") and rotating portion 132 (i.e., swivel component) in a default, disengaged position and orientation, respectively, before any microscopy slide locking mechanism is triggered. Accordingly, microscopy slide 108 is not securely locked in stage slot 104. Once microscopy slide locking mechanism is triggered, the top right corner of microscopy slide is expected to eventually align with the top right corner of stage slot 104. The adjustable nature of dynamic securing element 124 enables microscopy slides 108 of various dimensions to snugly fit within stage slot 104. A transition from FIG. 2A to FIG. 2B shows dynamic securing element 124, translating portion 128, and/or rotating portion 132 undergoing translation from distal position to proximal position, thereby displacing microscopy slide 108 until its top edge aligns with a top edge of stage slot 104. FIG. 2B illustrates an intermediate stage of microscopy slide locking operation, wherein the top edge of microscopy slide 108 aligns with the top edge of stage slot 104 and rotating portion 132 is still in its default, disengaged orientation without any rotation with respect to translating portion 128. Microscopy slide 108 may then be moved horizontally using rotating portion 132. A transition from FIG. 2B to FIG. 2C shows rotating portion 132 undergoing rotation to further position microscopy slide 108 until its right edge aligns with a right edge of the stage slot 104. Due to the rotation of rotating portion 132, a vertical force pushing microscopy slide 108 toward the top of stage slot 104 is reduced while at the same time a horizontal force pushing the microscopy slide 108 towards the right side of the slot is increased. Once such horizontal movement is complete, the top right corner of microscopy slide 108 is held in its designated corner position throughout the duration of microscopy measurements. FIG. 2C illustrates dynamic securing element 124 in an engaged position with microscopy slide 108 securely locked within stage slot 104; rotating portion 132 is at an orientation different from its default orientation, i.e., an adaptive orientation, as it holds microscopy slide 108 in place.

With continued reference to FIGS. 2A-C, in an alternative scenario to FIG. 2B, the right edge of microscopy slide 108 may reach the edge of stage slot first, halting further horizontal movement. In this case, additional pushing does not lead to rotation of rotating portion 132 due to a restricted unidirectional rotation allowed for the swivel mechanism. As the force continues to push microscopy slide 108, rotating portion 132, in this alternative scenario, may remain locked in its default orientation, and the force is directed vertically to move microscopy slide 108 to the top edge of stage slot 104. Additional details regarding such unidirectional rotation will be provided below.

Figure 3A:
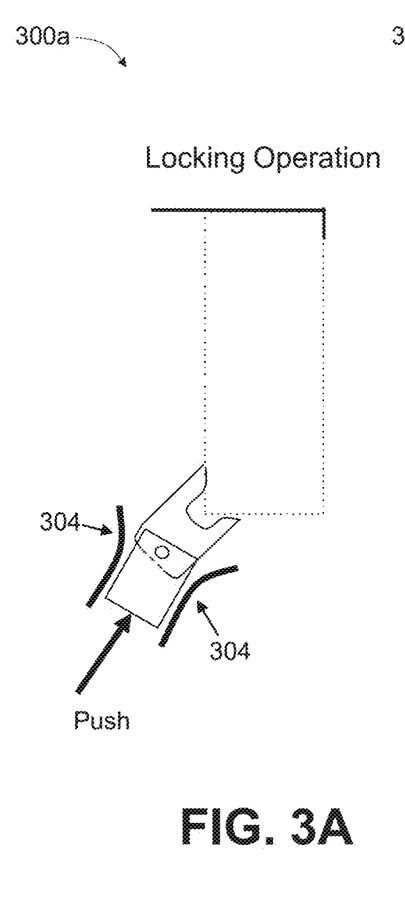
FIGS. 3A-B are schematic illustrations of exemplary embodiments of guiderails in the system and their locking and unlocking operations.
Figure 3B:
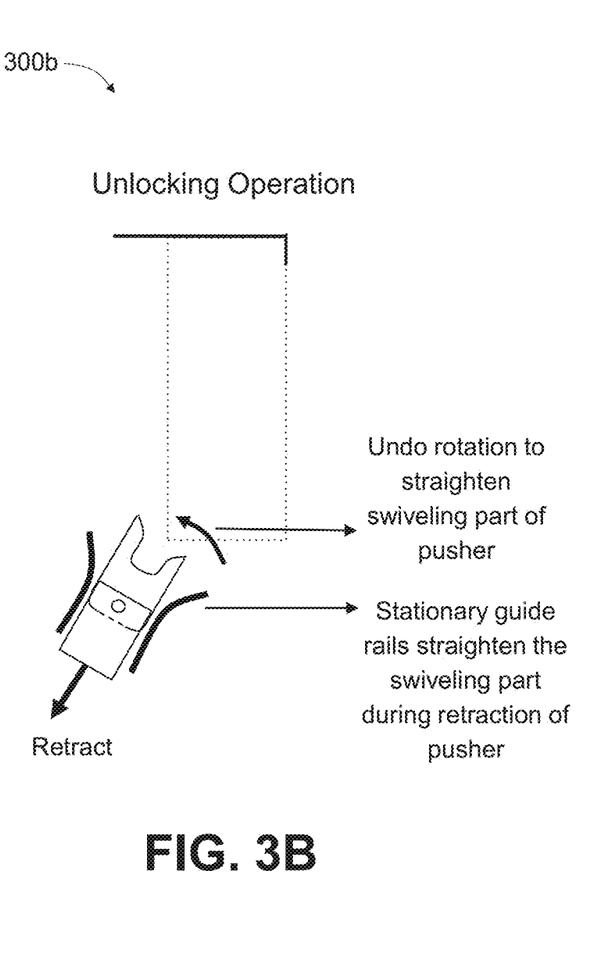

Referring now to FIGS. 3A-B, exemplary embodiments 300*a-b* of guide rails 304 in system 100 and their locking/unlocking operations are illustrated. In one or more embodiments, system 100 may further include a plurality of guide rails 304. Plurality of guide rails 304 may be configured to direct a movement of dynamic securing element 124 as it is pushed from distal position to proximal position, see 300*a*, or as it is retracted from proximal position to distal position, see 300*b*. As a nonlimiting example, system 100 may include a pair of guide rails 304. Specifically, in some cases, plurality of guide rails 304 may include a first guide rail 304 and a second guide rail 304 separated from the first guide rail 304 by a distance. At least a first portion of first guide rail 304 may be oriented at an angle relative to at least a second portion of second guide rail 304, thereby forming a channel that opens toward microscopy slide. The movement of dynamic securing element 124 may be controlled using guide rails 304. Guide rails 304 may flare out towards microscopy slide 108 to allow for the swivel action of dynamic securing element 124. Similarly, guide rails 304 may also straighten rotating portion 132 during retraction of dynamic securing element 124. In case rotating portion 132 is at an angle with respect to translating portion 128 of dynamic securing element 124, it needs to be brought back to its default orientation for it to be effective during subsequent locking operations.

Figure 4:
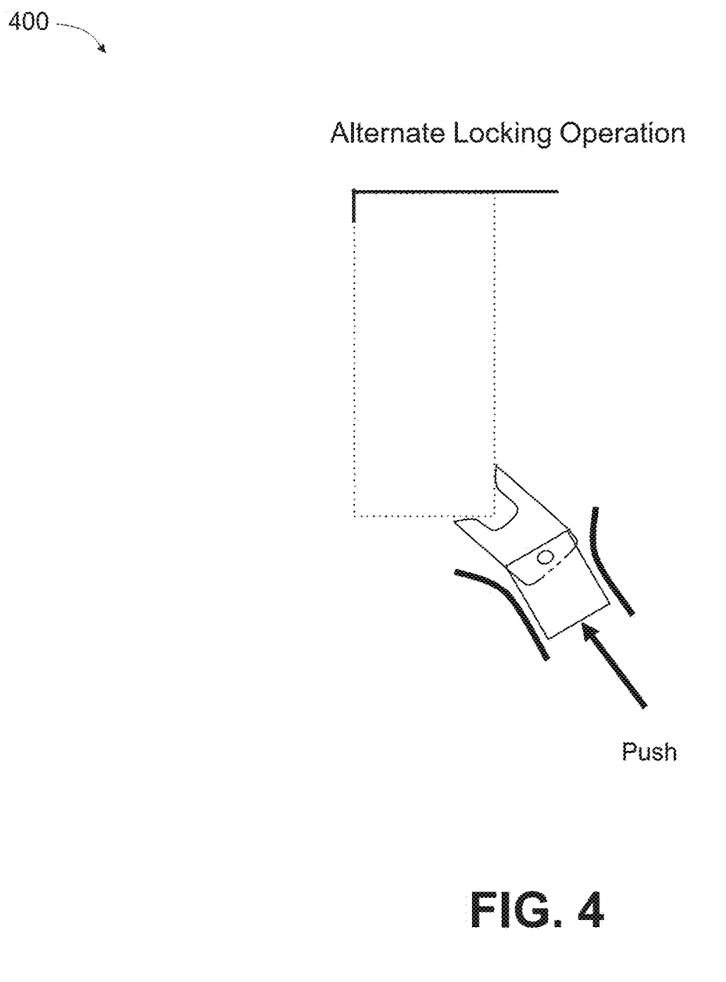
FIG. 4 is a front view of a schematic illustration of an alternative exemplary embodiment of the system.

Referring now to FIG. 4, an alternative exemplary embodiment 400 of system 100 is illustrated. In embodiment 400, microscopy slide 108 is expected to be aligned with the top left corner of stage slot 104 instead of the top right corner. All components herein are mirror images of details descried above.

Figure 5A:
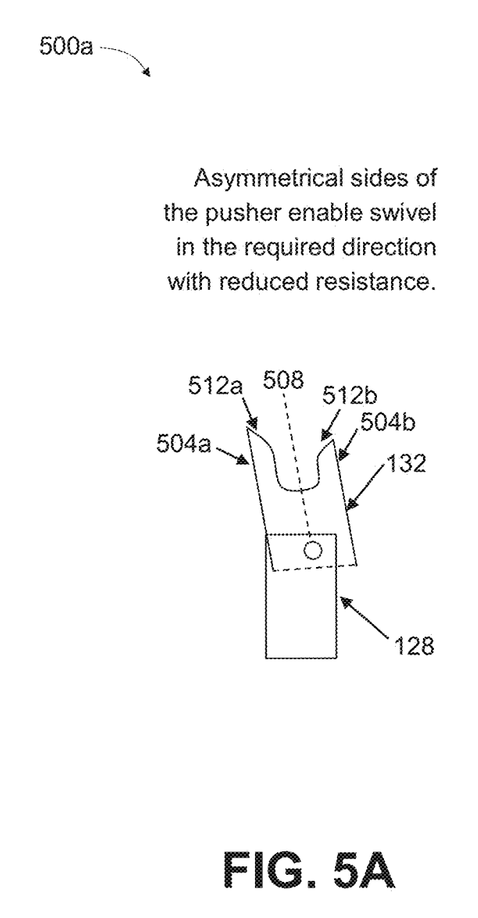
FIGS. 5A-B are schematic illustrations of exemplary embodiments pertaining to several asymmetrical mechanical design features of the system.
Figure 5B:
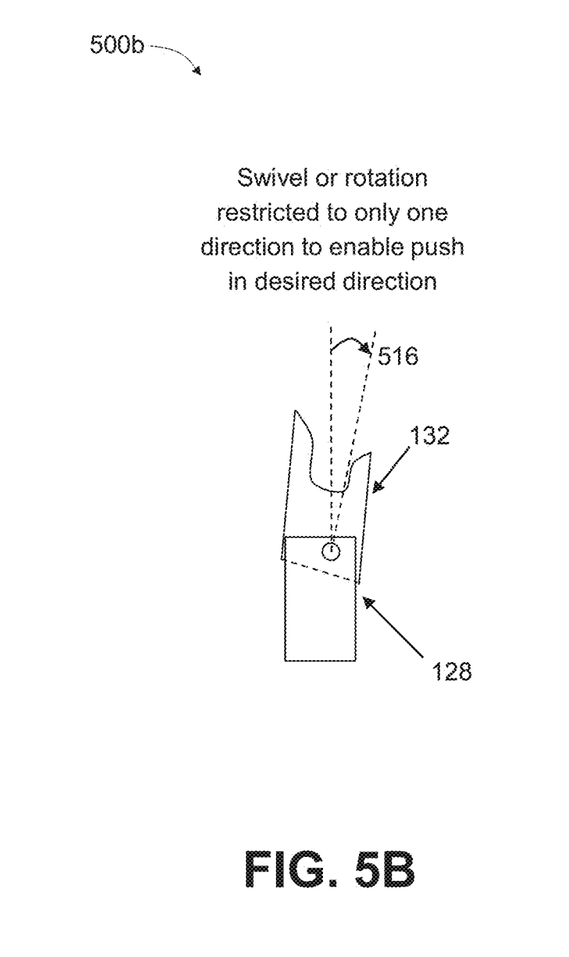

Referring now to FIGS. 5A-B, exemplary embodiments pertaining to several asymmetrical mechanical design features of system 100 are illustrated. In one or more embodiments, dynamic securing element 124 may include an asymmetrical design, as seen in FIG. 5A and embodiment 500*a*. Such asymmetry may result in a bias or preference in the direction of an expected rotation or swivel. In one or more embodiments, prongs 504 may be constructed differently to impart asymmetry. Specifically, in some cases, a first prong 504*a* of prongs 504*a-b* may include a first length or size, a second prong 504*b* of the prongs 504*a-b* may include a second length or size different from the first length or size. By placing prong 504*a-b* with a smaller size in the direction of a rotation or swivel, a resistance of the rotation or swivel may be minimized.

With continued reference to FIGS. 5A-B, alternative means may be implemented for introducing asymmetrical designs, as shown in FIG. 5B and embodiment 500*b*. In some cases, rotating portion 132 may include a longitudinal axis 508. A first prong 504*a* of prongs 504*a-b* may include a first facet 512*a* disposed at a first angle with respect to longitudinal axis 508, a second prong 504*b* of the prongs 504*a-b* may include a second facet 512*b* facing opposite the first facet 512*a* and disposed at a second angle with respect to the longitudinal axis, and the first angle is different from the second angle. Additionally, and/or alternatively, in one or more embodiments, system 100 may be configured to perform asymmetrical motions, as seen in FIG. 5B. In some cases, rotation of rotating portion 132 may be restricted to a unidirectional rotation 516, thereby enabling the rotation of rotating portion 132 in a desired direction to lock microscopy slide 108 in a locked/engaged position.

Figure 6:
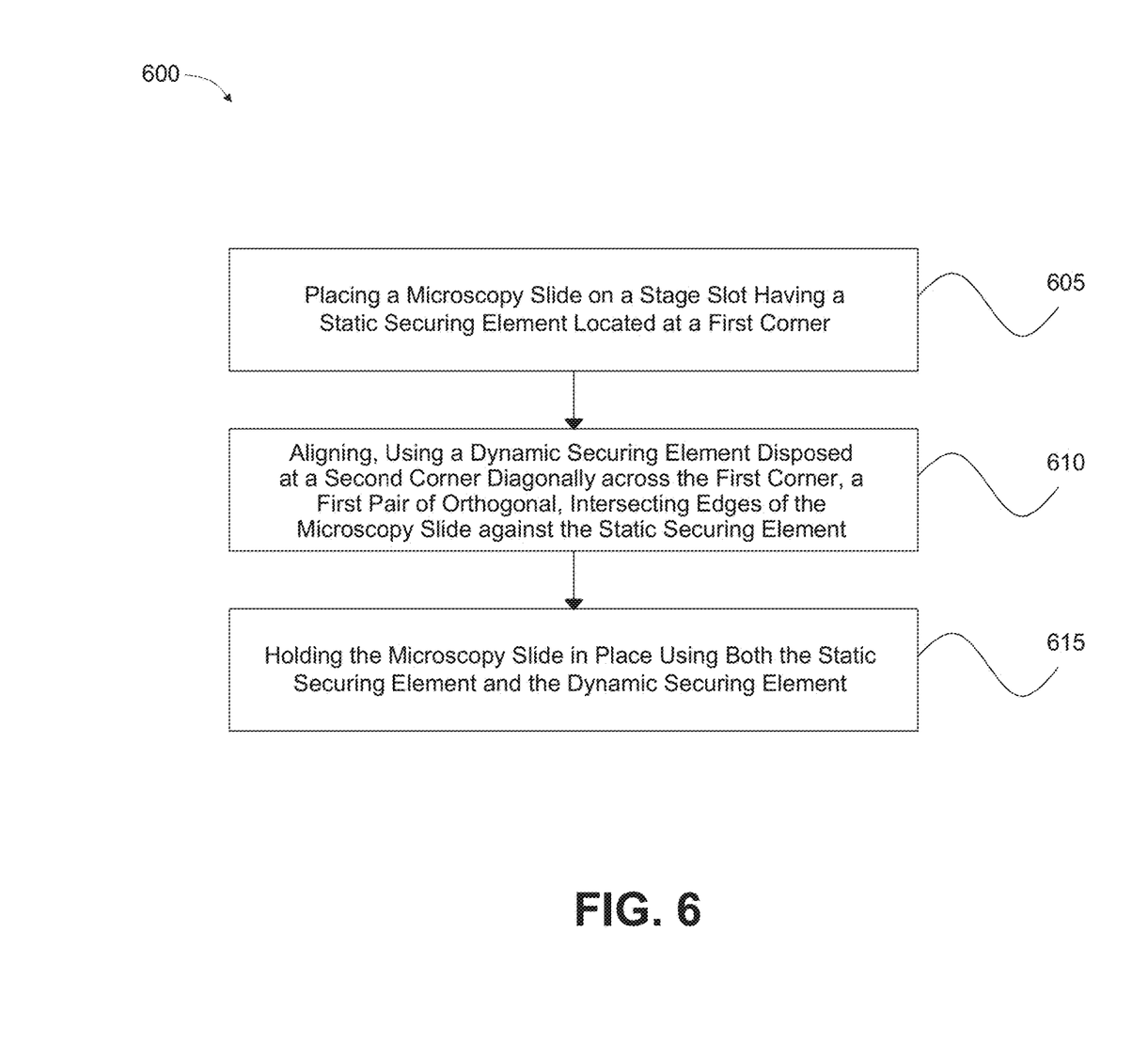
FIG. 6 is a flow diagram of an exemplary embodiment of a method for microscopy slide locking using a swivel mechanism.

Referring now to FIG. 6, FIG. 6 includes a flow diagram that illustrates an exemplary embodiment of a method 600 for microscopy slide locking using a swivel mechanism. At step 605, method 600 includes placing microscopy slide 108 on stage slot 104 having static securing element 120 located at first corner 112. This step may be implemented with reference to details described above in this disclosure and without limitation.

With continued reference to FIG. 6, at step 610, method 600 includes aligning, using dynamic securing element 124 disposed at second corner 116 diagonally across first corner 112, first pair of orthogonal, intersecting edges of microscopy slide 108 against static securing element 120 by translating translating portion 128 of the dynamic securing element 124 in translational direction 136 from distal position to proximal position with respect to static securing element 120 disposed diagonally across the dynamic securing element 124, and rotating rotating portion 132 of the dynamic securing element 124 around axis of rotation 140 that is normal to face of the microscopy slide 108 and the translational direction 136 to contact at second pair of orthogonal, intersecting edges of the microscopy slide 108 diagonally opposite the first pair of orthogonal, intersecting edges of the microscopy slide 108. This step may be implemented with reference to details described above in this disclosure and without limitation. In some cases, method 600 may further include aligning, using dynamic securing element 124, the top right corner of microscopy slide 108 to the top right corner of stage slot 104. In some cases, method 600 may further include aligning, using dynamic securing element 124, the top left corner of microscopy slide 108 to the top left corner of stage slot 104. In one or more embodiments, rotating portion 132 may include prongs 504a-b, and each prong 504a-b of the prongs 504a-b may include at least a point of contact with an edge of microscopy slide 108. In some cases, method 600 may include distributing pressure using a plurality of points of contacts, thereby reducing an impact applied against microscopy slide 108. Such plurality of points of contact may be disposed at a plurality of distances from axis of rotation 140. In some cases, method 600 may further include displacing microscopy slide 108 in a horizontal direction. Specifically, displacing microscopy slide 108 may include generating a first torque at a first point of contact and generating a second torque at a second point of contact, wherein the first torque is larger than the second torque. In some cases, method 600 may further include pushing, using dynamic securing element 124 under a first configuration (e.g., with a default orientation of rotating portion 132), microscopy slide 108 diagonally until its top edge aligns with a top edge of stage slot 104, and pushing, using the dynamic securing element 124 under a second configuration (e.g., with an adaptive orientation of rotating portion 132), the microscopy slide 108 horizontally until it is in contact with static securing element 120. In some cases, method 600 may further include restricting a rotation of rotating portion 132 to a unidirectional rotation towards first corner 112. In some cases, method 600 may further include constructing rotating portion 132 with a second thickness 152, wherein the second thickness is smaller than a first thickness 148 pertaining to microscopy slide 108, consistent with details described above.

With continued reference to FIG. 6, at step 615, method 600 includes holding microscopy slide 108 in place using both static securing element 120 and dynamic securing element 124. This step may be implemented with reference to details described above in this disclosure and without limitation.

Figure 7:
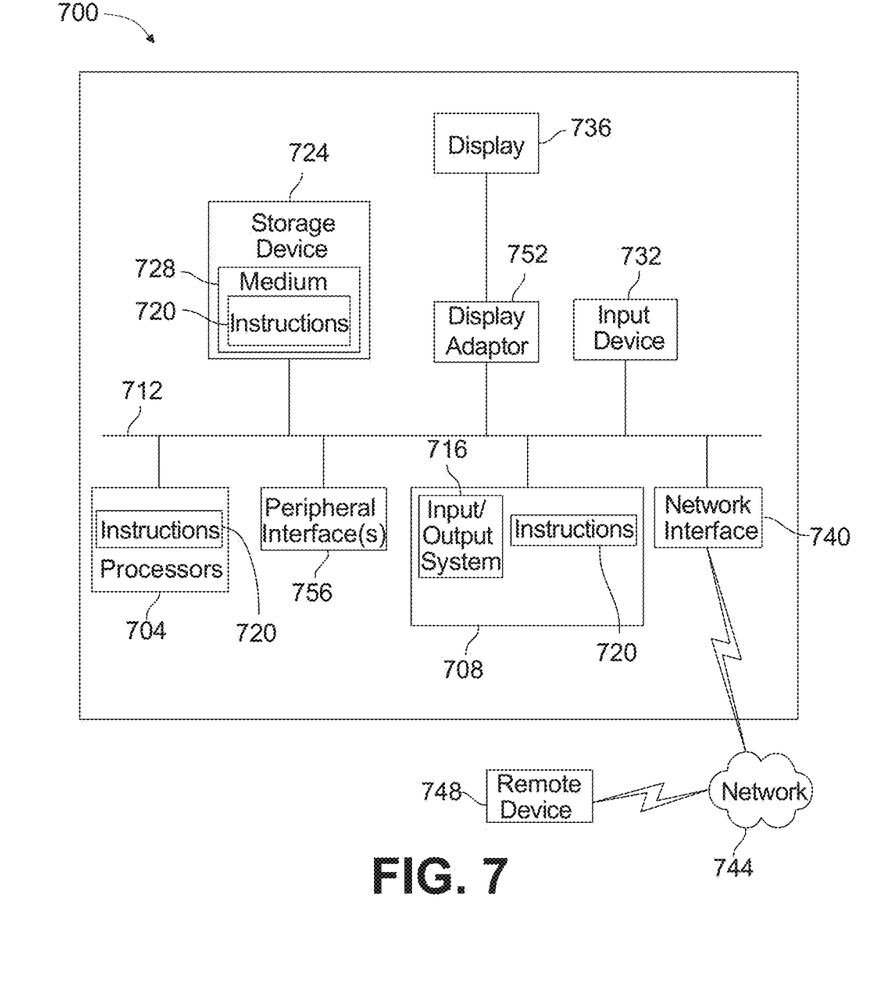
FIG. 7 is a block diagram of an exemplary embodiment of a computing system that can be used to implement any one or more of the methodologies disclosed herein and any one or more portions thereof.

Referring now to FIG. 7, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 7, the figure shows a diagrammatic representation of one embodiment of a computing device in the exemplary form of a computing system 700 within which a set of instructions for causing the computing system 700 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 700 may include a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures. Processor 704 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 704 may be organized according to Von Neumann and/or Harvard architecture as a nonlimiting example. Processor 704 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

Memory 708 may include various components (e.g., machine-readable media) including, but not limited to, a random-access memory component, a read only component, and any combinations thereof. In one example, a basic input/output system 716, including basic routines that help to transfer information between elements within computing system 700, such as during start-up, may be stored in memory 708. Memory 708 (e.g., stored on one or more machine-readable media) may also include instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computing system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 724 (or one or more components thereof) may be removably interfaced with computing system 700 (e.g., via an external port connector (not shown)). Particularly, storage device 724 and an associated machine-readable medium 728 may provide nonvolatile and/or volatile storage of machine-readable instructions, data structures, program modules, and/or other data for computing system 700. In one example, software 720 may reside, completely or partially, within machine-readable medium 728. In another example, software 720 may reside, completely or partially, within processor 704.

With continued reference to FIG. 7, computing system 700 may also include an input device 732. In one example, a user of computing system 700 may enter commands and/or other information into computing system 700 via input device 732. Examples of input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

With continued reference to FIG. 7, user may also input commands and/or other information to computing system 700 via storage device 724 (e.g., a removable disk drive, a flash drive, etc.) and/or network interface device 740. A network interface device, such as network interface device 740, may be utilized for connecting computing system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computing system 700 via network interface device 740.

With continued reference to FIG. 7, computing system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computing system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for microscopy slide locking using a swivel mechanism, the system comprising:
   a stage slot configured to fit a microscopy slide, the stage slot comprising a first corner and a second corner diagonally across the first corner;
   a static securing element disposed at the first corner, wherein the static securing element is configured to contact a microscopy slide at a first pair of orthogonal, intersecting edges of the microscopy slide; and
   a dynamic securing element disposed at the second corner and configured to contact the microscopy slide at a second pair of orthogonal, intersecting edges of the microscopy slide diagonally opposite the first pair of orthogonal, intersecting edges of the microscopy slide, wherein the dynamic securing element comprises:
      a translating portion configured to slide in a translational direction between a proximal position and a distal position with respect to the static securing element; and
      a rotating portion rotationally connected to the translating portion and configured to rotate around an axis of rotation that is normal to a face of the microscopy slide and the translational direction, thereby reversibly securing the microscopy slide in a locked position by translating the translating portion from the distal position to the proximal position.

2. The system of claim 1, wherein:
   the rotating portion comprises a plurality of prongs; and
   each prong of the plurality of prongs comprises at least a point of contact with an edge of the microscopy slide.

3. The system of claim 2, wherein:
   a first prong of the plurality of prongs comprises a first length;
   a second prong of the plurality of prongs comprises a second length; and
   the first length is different from the second length.

4. The system of claim 2, wherein:
   the rotating portion comprises a longitudinal axis;
   a first prong of the plurality of prongs comprises a first facet disposed at a first angle with respect to the longitudinal axis;
   a second prong of the plurality of prongs comprises a second facet facing opposite the first facet and disposed at a second angle with respect to the longitudinal axis; and
   the first angle is different from the second angle.

5. The system of claim 1, further comprising a plurality of guide rails configured to direct a movement of the dynamic securing element.

6. The system of claim 5, wherein:
   the plurality of guide rails comprises a first guide rail and a second guide rail separated from the first guide rail by a distance; and
   at least a first portion of the first guide rail is oriented at an angle relative to at least a second portion of the second guide rail, thereby forming a channel that opens toward the microscopy slide.

7. The system of claim 1, wherein the stage slot comprises a plurality of adjustable dimensions configured to fit microscopy slides of a plurality of sizes.

8. The system of claim 1, wherein the rotation of the rotating portion is restricted to a unidirectional rotation.

9. The system of claim 1, wherein the rotating portion comprises a chamfer.

10. The system of claim 1, wherein:
    the microscopy slide comprises a first thickness;
    the rotating portion comprises a second thickness; and
    the second thickness is smaller than the first thickness.

11. A method for microscopy slide locking using a swivel mechanism, the method comprising:
    placing a microscopy slide on a stage slot having a static securing element located at a first corner;
    aligning, using a dynamic securing element disposed at a second corner diagonally across the first corner, a first pair of orthogonal, intersecting edges of the microscopy slide against the static securing element by:
       translating a translating portion of the dynamic securing element in a translational direction from a distal position to a proximal position with respect to the static securing element disposed diagonally across the dynamic securing element; and
       rotating a rotating portion of the dynamic securing element around an axis of rotation that is normal to a face of the microscopy slide and the translational direction to contact at a second pair of orthogonal, intersecting edges of the microscopy slide diagonally opposite the first pair of orthogonal, intersecting edges of the microscopy slide; and
    holding the microscopy slide in place using both the static securing element and the dynamic securing element.

12. The method of claim 11, further comprising:
    aligning, using the dynamic securing element, a top right corner of the microscopy slide to a top right corner of the stage slot.

13. The method of claim 11, further comprising:
    aligning, using the dynamic securing element, a top left corner of the microscopy slide to a top left corner of the stage slot.

14. The method of claim 11, wherein:
    the rotating portion comprises a plurality of prongs; and
    each prong of the plurality of prongs comprises at least a point of contact with an edge of the microscopy slide.

15. The method of claim 14, further comprising:
    distributing pressure using a plurality of points of contact to reduce an impact applied against the microscopy slide.

16. The method of claim 15, wherein the plurality of points of contact is disposed at a plurality of distances from the axis of rotation.

17. The method of claim 16, further comprising displacing the microscopy slide in a horizontal direction, wherein displacing the microscopy slide comprises:
    generating a first torque at a first point of contact; and generating a second torque at a second point of contact, wherein the first torque is larger than the second torque.

18. The method of claim 11, further comprising:
pushing, using the dynamic securing element under a first configuration, the microscopy slide diagonally until its top edge aligns with a top edge of the stage slot; and
pushing, using the dynamic securing element under a second configuration, the microscopy slide horizontally until it is in contact with the static securing element.

19. The method of claim 11, further comprising:
restricting the rotation to a unidirectional rotation towards the first corner.

20. The method of claim 11, further comprising:
constructing the rotating portion with a second thickness, wherein the second thickness is smaller than a first thickness pertaining to the microscopy slide.

\* \* \* \* \*